T. GILBERT-RUSSELL.
SPRING TIRE.
APPLICATION FILED AUG. 22, 1910.
1,031,436.
Patented July 2, 1912.
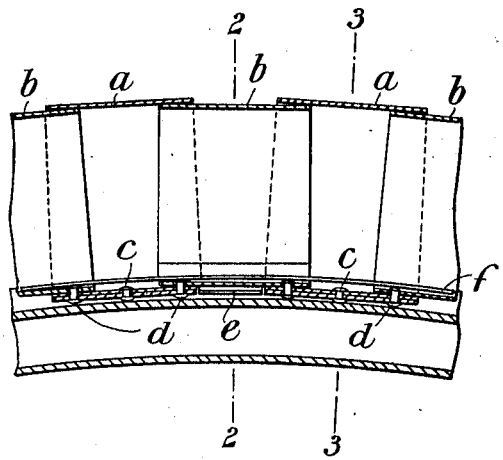
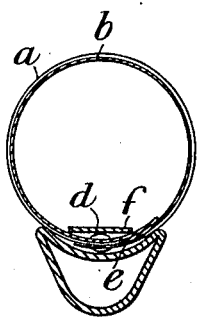
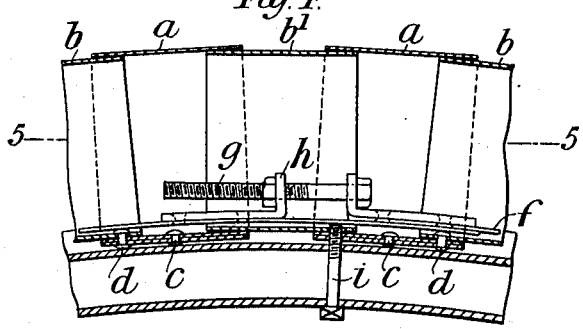
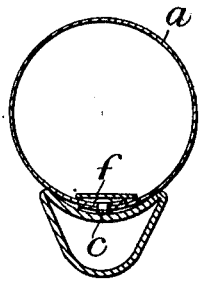
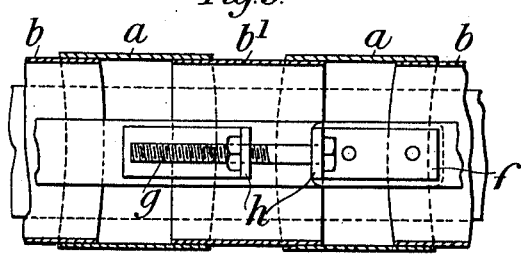
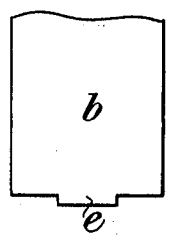
Witnesses.
Inventor.

UNITED STATES PATENT OFFICE.

THOMAS GILBERT-RUSSELL, OF LYNDHURST, ENGLAND.

SPRING-TIRE.

1,031,436.  Specification of Letters Patent.  Patented July 2, 1912.

Application filed August 22, 1910. Serial No. 578,452.

*To all whom it may concern:*

Be it known that I, THOMAS GILBERT-RUSSELL, a subject of the King of Great Britain, residing at Lyndhurst, Salt Hill, Slough, Buckinghamshire, England, have invented new and useful Spring-Tires, of which the following is a specification.

My invention relates to elastic metal tires adapted for use upon cycles and like vehicles and to that class of tire wherein a series of ring-shaped elements are fitted together and adapted to be used without any external cover or jacket.

In a tire constructed according to my invention the ring-shaped sections or elements are made of two slightly different diameters, the sections of different diameter being arranged alternately so that the sections of smaller diameter fit into the sections of larger diameter.

To enable my invention to be fully understood, I will describe the same by reference to the accompanying drawing, in which:—

Figure 1 is a longitudinal vertical section of the tire and rim constructed in accordance with my invention, Figs. 2 and 3 are sections on the lines 2—2, and 3—3 respectively of Fig. 1, Fig. 4 is a view similar to Fig. 1, illustrating a method of securing the tire to the rim, and Fig. 5 is a sectional view on the line 5—5, Fig. 4. Fig. 6 is a view illustrating a construction of the ends of the sections of smaller diameter.

$a$, $a$ indicate the sections of larger diameter, and $b$, $b$ the sections of smaller diameter which are fitted one set within the other. The sections $a$, $a$ of larger diameter are formed of strip steel suitably tempered and bent into cylindrical form, the two ends being united by rivets $c$, $c$ or otherwise suitably connected so that the said sections $a$, $a$ will permanently retain their form. The sections $b$, $b$ are also each formed of a strip of tempered steel bent into cylindrical form of slightly smaller diameter than the sections $a$, $a$ so that when the sections $b$, $b$ are inserted into the adjacent ends of the sections $a$, $a$, the natural extension of the said sections $b$, $b$, will cause them to accurately fit against the inner surfaces of the said larger sections. The ends of the strips forming the sections $b$, $b$ are not riveted together but the strip of each section is connected at one end to the adjacent sections by rivets $d$, $d$ for the purpose of retaining the several sections in their proper relative positions. The free end of the strips of each of the sections $b$, $b$ is provided with a tongue $e$ as shown in Fig. 6, which tongue abuts between the two sections $a$, $a$ as shown in Fig. 1, and serves as a distance piece for further assisting in retaining the sections in their proper relative positions.

It will be understood that a tube made up of sections as hereinbefore described, is first constructed and it is then bent around the wheel rim and secured thereon.

The tire is advantageously secured by means of a steel band $f$ or the like passed through the tire, and having its ends adjustably connected, for instance, by means of a bolt $g$ passing through lugs $h$, $h$ secured to the band, the screwing up of the nut upon the said bolt serving to tighten the band and so drawn down the tire into the rim. In order to afford access to this nut which is within the tire, one section, say the section indicated at $b'$ in Figs. 4 and 5 may be left loose so that it may be telescoped into the adjacent section to leave a gap in the tire, the said section $b'$ when the tightening band is adjusted, being pulled back into position to close the gap, and secured, for instance, by means of a screw $i$ passed through the wheel rim into a hole in the said sliding section as shown in Fig. 4.

Claims.

1. A wheel tire comprising a series of ring shaped strips of different diameters adapted to fit alternately one within the other, each strip of larger diameter being united at its ends, and each strip of smaller diameter being connected at one of its ends to the adjacent strips of larger diameter into which they are fitted.

2. A wheel tire comprising a series of ring shaped strips of different diameters adapted to fit alternately one within the other, each strip of large diameter being united at its ends, and each strip of smaller diameter being secured at one of its ends to the adjacent strips of larger diameter and provided at its other extremity with a tongue adapted to abut against the adjacent strips of larger diameter and act as a distance piece.

THOMAS GILBERT-RUSSELL.

Witnesses:
JOHN E. BOUSFIELD,
A. ALBUTT.